US010547465B2

(12) United States Patent
Bradley et al.

(10) Patent No.: US 10,547,465 B2
(45) Date of Patent: *Jan. 28, 2020

(54) RESUMING A CONTEXT ON A GROUP OF ELECTRONIC DEVICES

(71) Applicant: International Business Machines Corporation, Armonk, NY (US)

(72) Inventors: Lisa M. Bradley, Cary, NC (US); Liam Harpur, Dublin (IE); Aaron J. Quirk, Raleigh, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,657

(22) Filed: Dec. 12, 2017

(65) Prior Publication Data

US 2018/0262357 A1   Sep. 13, 2018

Related U.S. Application Data

(63) Continuation of application No. 15/452,822, filed on Mar. 8, 2017.

(51) Int. Cl.
*G06F 15/16* (2006.01)
*H04L 12/18* (2006.01)
(Continued)

(52) U.S. Cl.
CPC .......... *H04L 12/1822* (2013.01); *H04L 67/18* (2013.01); *H04L 67/2804* (2013.01); *H04L 12/1818* (2013.01); *H04W 4/80* (2018.02)

(58) Field of Classification Search
CPC ..... H04L 12/1822; H04L 67/18; H04L 67/22; H04L 67/2804; H04L 67/306
(Continued)

(56) References Cited

U.S. PATENT DOCUMENTS 6,085,166 A   7/2000  Beckhardt et al.
6,462,767 B1  10/2002  Obata et al.
(Continued)

OTHER PUBLICATIONS

Starling Forum, "New Feature: handling a lost device context", http://forum.starling-framework.org/topic/new-feature-handling-a-lost-device-context/page/2, Date Printed Jan. 18, 2017, 13 pages.
(Continued)

*Primary Examiner* — Alan S Chou
(74) *Attorney, Agent, or Firm* — Maeve M. Carpenter; Hunter E. Webb; Keohane & D'Alessandro PLLC

(57) ABSTRACT

Approaches presented herein enable resuming a context for a group of electronic devices based on a prior activity of the group members. Specifically, a current context of a user electronic device is collected at a conclusion of a first collaboration session. One or more participant electronic devices associated with the user electronic device are identified, either by being in a same location or virtually connected. A current context of each of the identified participant electronic devices is collected. The context of the user electronic device and each of the participant electronic devices are stored in a context database. The current context of the user electronic device and each of the participant electronic devices are resumed at a beginning of a second collaboration session when the user electronic device is resumed (e.g., powered on or brought out of "sleep" mode).

14 Claims, 4 Drawing Sheets

(51) Int. Cl.
*H04L 29/08* (2006.01)
*H04W 4/80* (2018.01)

(58) Field of Classification Search
USPC .......................................................... 709/204
See application file for complete search history.

(56) References Cited

U.S. PATENT DOCUMENTS

| | | | |
|---|---|---|---|
| 6,529,136 B2 | 3/2003 | Cao et al. | |
| 7,995,533 B1 | 8/2011 | Koodli et al. | |
| 8,224,894 B1 | 7/2012 | Parks et al. | |
| 8,938,518 B2 | 1/2015 | Anderson et al. | |
| 9,106,721 B2* | 8/2015 | Quan | H04L 67/1097 |
| 9,697,497 B2* | 7/2017 | Kessel | H04L 67/1095 |
| 2006/0070003 A1* | 3/2006 | Thompson | G06F 3/0481 |
| | | | 715/758 |
| 2008/0052377 A1* | 2/2008 | Light | G06Q 10/107 |
| | | | 709/218 |
| 2014/0304409 A1 | 10/2014 | Kamath et al. | |
| 2014/0304612 A1 | 10/2014 | Collin | |
| 2015/0149404 A1* | 5/2015 | Lock | H04L 65/403 |
| | | | 707/608 |
| 2016/0259620 A1* | 9/2016 | Millington | H04J 3/0664 |
| 2016/0278160 A1 | 9/2016 | Schliwa-Bertling et al. | |
| 2017/0046113 A1* | 2/2017 | Noyes | G06F 17/243 |
| 2017/0230617 A1 | 8/2017 | Dunn et al. | |
| 2018/0011848 A1* | 1/2018 | Spataro | G06F 16/93 |
| 2018/0063258 A1* | 3/2018 | Wang | H04L 67/141 |

OTHER PUBLICATIONS

IEEE, "Synchronized context sharing over multiple devices: Personalized rendering of multimodal contents", 2016 International Conference on Big Data and Smart Computing (BigComp) (2016), Hong Kong, China, Jan. 18-20, 2016, ISSN: 2375-9356, ISBN: 978-1-4673-8795-8, pp. 365-369.

Chou, Alan S., U.S. Appl. No. 15/452,822, Office Action dated Jan. 23, 2019, 13 pgs.

Alan S. Chou, USPTO Notice of Allowance and Fee(s) Due, U.S. Appl. No. 15/452,822, dated Jun. 12, 2019, 11 pages.

Alan S. Chou, USPTO Notice of Allowance and Fee(s) Due, U.S. Appl. No. 15/452,822, dated Sep. 25, 2019, 15 pages.

* cited by examiner

RESUMING A CONTEXT ON A GROUP OF ELECTRONIC DEVICES

CROSS-REFERENCE TO RELATED APPLICATIONS

The present patent document is a continuation of U.S. patent application Ser. No. 15/452,822, filed Mar. 8, 2017, entitled "RESUMING A CONTEXT ON A GROUP OF ELECTRONIC DEVICES", the disclosure of which is incorporated herein by reference.

TECHNICAL FIELD

This invention relates generally to electronic devices and, more specifically, to resuming a context on a group of electronic devices based on a prior activity of the group members.

BACKGROUND

The use of electronic devices such as smartphones, tablet computers, laptop and personal computers has become more and more pervasive in society, and many users own multiple such devices. The varied functions that these devices can perform continue to expand. The expansion often includes the integration of personal computer technology into other electronic devices, such as smartphones and tablets. By utilizing computer technology, users can now have access to computing functions and resources in multiple devices. Various applications, such as applications for communicating and collaborating with others, have been developed and are being developed for use in these different device types.

SUMMARY

In general, approaches presented herein enable resuming a context for a group of electronic devices based on a prior activity of the group members. Specifically, a current context of a user electronic device is collected at a conclusion of a first collaboration session. One or more participant electronic devices associated with the user electronic device are identified, either by being in a same location or virtually connected. A current context of each of the identified participant electronic devices is collected. The context of the user electronic device and each of the participant electronic devices are stored in a context database. The current context of the user electronic device and each of the participant electronic devices are resumed at a beginning of a second collaboration session when the user electronic device is resumed (e.g., powered on or brought out of "sleep" mode).

One aspect of the present invention includes a computer-implemented method resuming a group context, comprising: collecting, at a conclusion of a first collaboration session, a current context of a user electronic device; identifying an participant electronic device that is associated with the user electronic device; collecting a current context of the participant electronic device; storing, as metadata, the current context of the user electronic device and the participant electronic device; identifying, at a beginning of a second collaboration session, the participant electronic device when the user electronic device is resumed; and resuming, based on the metadata, the current context of the user electronic device and the participant electronic device, wherein resuming includes closing any applications on the user electronic device that are not associated with the current context of the user electronic device and closing any applications on the participant electronic device that are not associated with the current context of the participant electronic device.

Another aspect of the present invention includes a computer program product for resuming a group context, and program instructions stored on the computer readable storage device, to: collect, at a conclusion of a first collaboration session, a current context of a user electronic device; identify a participant electronic device that is associated with the user electronic device; collect a current context of the participant electronic device; store, as metadata, the current context of the user electronic device and the participant electronic device; identify, at a beginning of a second collaboration session, the participant electronic device when the user electronic device is resumed; and resume, based on the metadata, the current context of the user electronic device and the participant electronic device, wherein the step to resume includes closing any applications on the user electronic device that are not associated with the current context of the user electronic device and closing any applications on the participant electronic device that are not associated with the current context of the participant electronic device.

Yet another aspect of the present invention includes a computer system for resuming a group context, the computer system comprising: a memory medium comprising program instructions; a bus coupled to the memory medium; and a processor for executing the program instructions, the instructions causing the system to: collect, at a conclusion of a first collaboration session, a current context of a user electronic device; identify a participant electronic device that is associated with the user electronic device; collect a current context of the participant electronic device; store, as metadata, the current context of the user electronic device and the participant electronic device; identify, at a beginning of a second collaboration session, the participant electronic device when the user electronic device is resumed; and resume, based on the metadata, the current context of the user electronic device and the participant electronic device, wherein the step to resume includes closing any applications on the user electronic device that are not associated with the current context of the user electronic device and closing any applications on the participant electronic device that are not associated with the current context of the participant electronic device.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
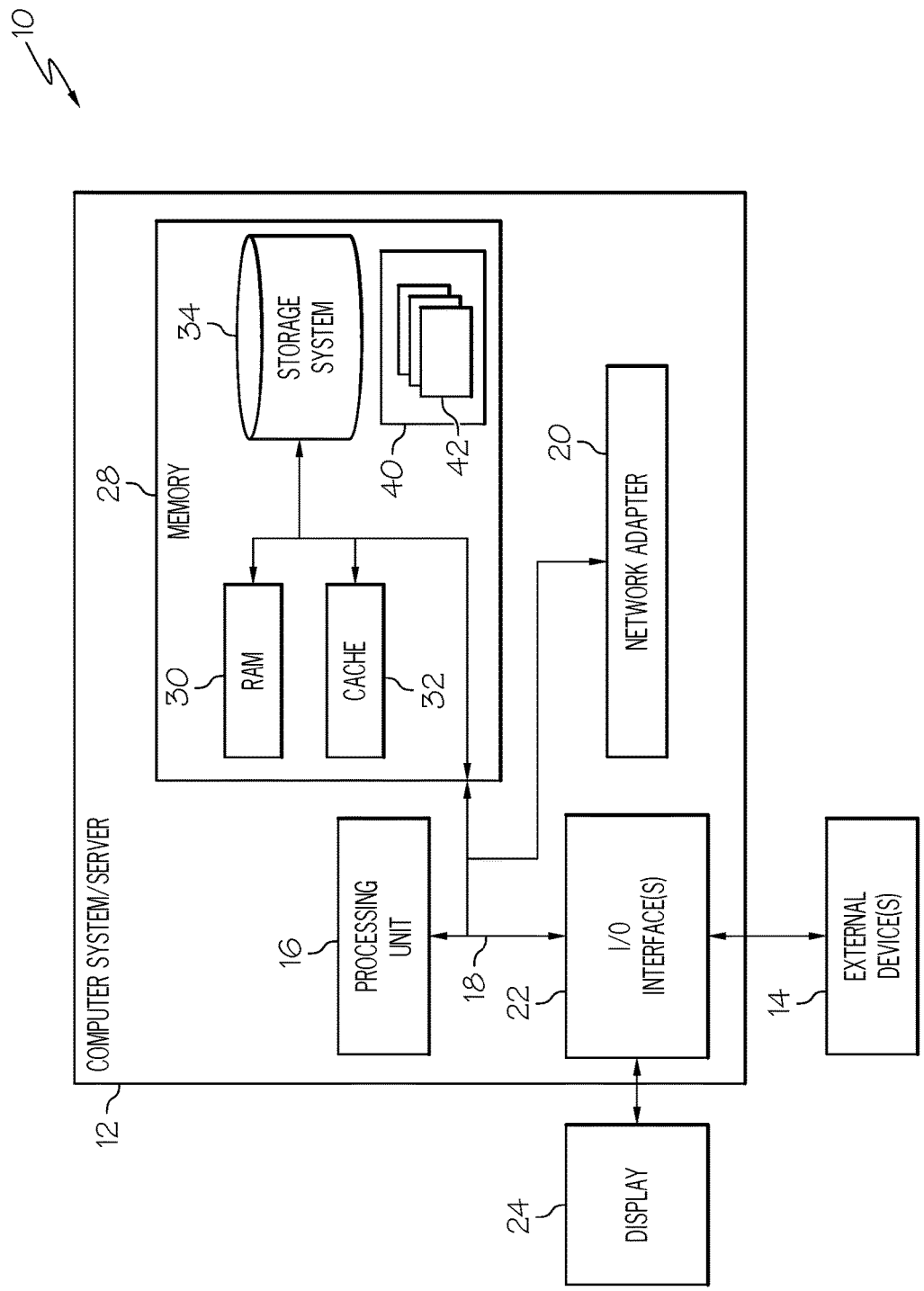
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention enable resuming a context for a group of electronic devices based on a prior activity of the group members. Specifically, a current context of a user electronic device is collected at a conclusion of a first collaboration session. One or more participant electronic devices associated with the user electronic device are identified, either by being in a same location or virtually connected. A current context of each of the identified participant electronic devices is collected. The context of the user electronic device and each of the participant electronic devices are stored in a context database. The current context of the user electronic device and each of the participant electronic devices are resumed at a beginning of a second collaboration session when the user electronic device is resumed (e.g., powered on or brought out of "sleep" mode).

Electronic communications devices such as smartphones, tablets, and laptops have become ubiquitous in society and some users own several such devices. Peer-to-peer (P2P) networking and so-called wireless personal area networks (e.g., WPANs or PANs) may be established between devices using various wireless connectivity capabilities such as Bluetooth®, Wireless USB, ZigBee, or other technologies, etc. Such networks enable device connectivity and can allow a user to seamlessly access content on different devices. For example, a user may begin reading an electronic version of a printed book (i.e., e-book) on a smartphone using a reader application. If the user owns a laptop, the user may at some time want to switch to using the laptop to continue reading the book with the same reader application also installed on the laptop, or some other convenient device. Book collections including highlights, notes, and bookmarks may be synched across all of a user's devices to enable a user to pick up on one device where she left off reading on another device. Although this allows a user to switch among multiple devices for a single application, one or more manual steps may be necessary to utilize a bookmark that has been previously saved. However, in this example, the second device is not aware of what the user was formerly doing on the first device, and intelligently determine what the resumed context should be on the second device, or a group of devices when a group of users meet again.

The inventors of the invention described herein have recognized certain deficiencies in known methods for resuming a context for a group of electronic devices based on a prior activity of the group members. While it is useful for a single user to resume a context (e.g., a reader application) manually on a different device, it would increase the productivity of a group of individuals to have the ability to meet and set one context and, when the same group of individuals meet a later time, the group of devices can automatically alert the individuals to switch to the prior context. This can save individuals from having to remember where the previous activities were paused and from requiring them to manually launch the previous activities. The group of devices may or may not be the same as the devices used during the prior meeting. For example, one person may have switched from a laptop to a smartphone, while the others in the group have the same device as earlier. This would allow the group to immediately pick up and continue where the prior meeting left off. The approaches described herein provide a seamless way for resuming a context for a group of electronic devices based on a prior activity of the group members.

Referring now to FIG. 1, a computerized implementation 10 of an embodiment for resuming a context for a group of electronic devices based on a prior activity of the group members will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for resuming a context for a group of electronic devices based on a prior activity of the group members. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for resuming a context for a group of electronic devices based on a prior activity of the group members, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
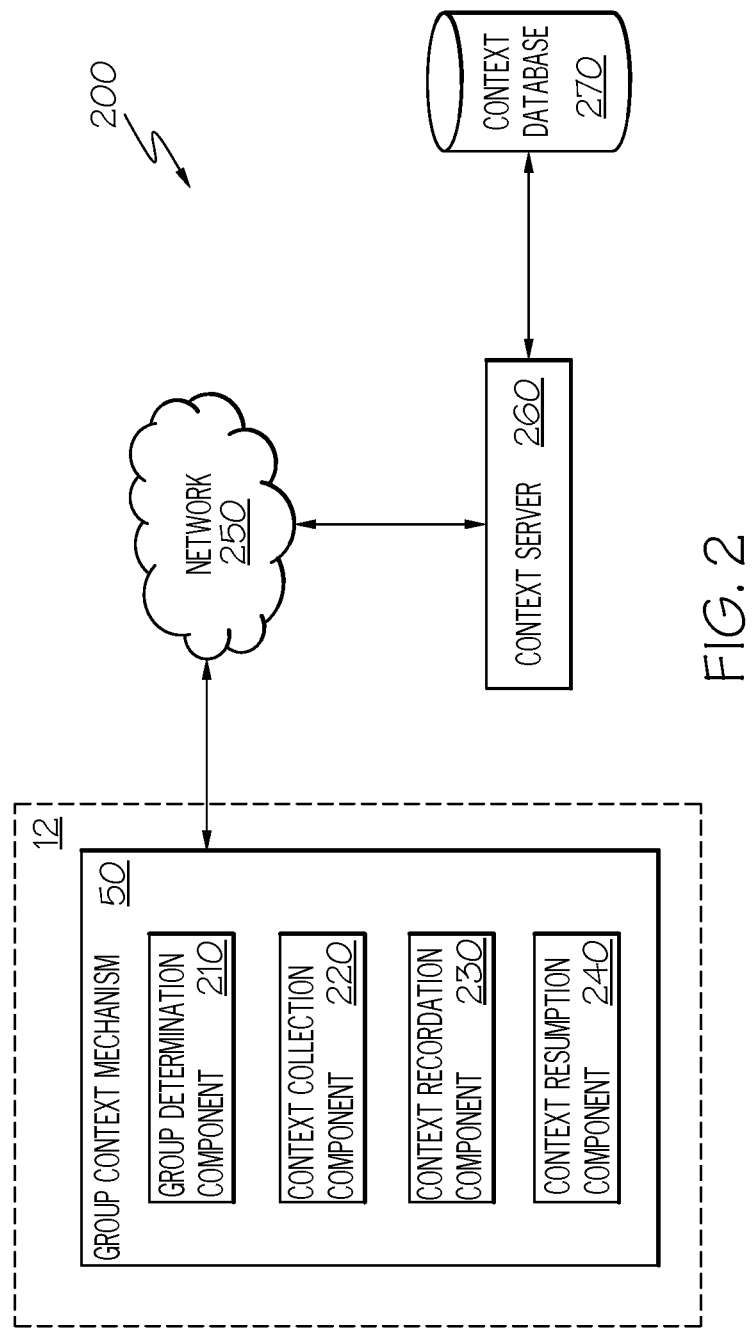
FIG. 2 shows a schematic diagram 200 illustrating an exemplary environment for implementation according to illustrative embodiments.

Referring now to FIG. 2, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a social media content repudiation mechanism 50 (hereinafter "system 50"). Rather, system 50 could be loaded on a server or server-capable device that communicates (e.g., wirelessly) with the physical server to indicate a repudiation of social media content.

Regardless, as depicted, system 50 can be implemented as program/utility 40 on computer system 12 of FIG. 1 and can enable the functions recited herein. It is further understood that system 50 can be incorporated within or work in conjunction with any type of system that receives, processes, and/or executes commands with respect to IT resources in a networked computing environment. Such other system(s) have not been shown in FIG. 2 for brevity purposes. As shown, group context mechanism 50 includes group determination component 210, context collection component 220, context recordation component 230, and context resumption component 240.

In an embodiment, a user may install group context mechanism 50 on a user electronic device (e.g., user electronic device 320A in FIG. 3) from one of several digital distribution platforms for electronic devices. Once the group context mechanism 50 has been downloaded on a user electronic device, the user may utilize a service for resuming a group context. In another embodiment, group context mechanism 50 may not reside locally on the user electronic device, but may be stored partially or entirely on a remote server and accessible to the user electronic device.

Example user electronic devices and participant electronic devices discussed herein include personal computers, digital assistants, personal digital assistants, mobile phones, smart phones, digital tablets, laptop computers, and other processor-based devices. In general, a user electronic device and/or participant electronic device may be any type of processor-based platform that is connected to network 250 and that interacts with one or more application programs. A user electronic device and/or participant electronic device may operate on any operating system capable of supporting a browser or browser-enabled application, such as Microsoft® Windows® or Linux. A user electronic device and/or participant electronic device can include, for example, a personal computer executing a browser application program such as Internet Explorer™ from Microsoft Corporation, Netscape Navigator™ from Netscape Communications Corporation, and/or Safari™ from Apple Computer, Inc. Through the user electronic device and/or participant electronic device, a person can communicate over network 250 with other systems and devices coupled to network 250.

As shown, group context mechanism 50 may be communicatively coupled with a context server 260 via a network 250. The network 250 may be any type of network or any combination of networks. Specifically, the network 250 may include wired components, wireless components, or both wired and wireless components. In an embodiment, context server 260 generally operates to obtain/maintain context and device information for one or more groups of participating individuals in context database 270. Data stored in context database 270 will be discussed in detail below.

In an embodiment, a user registration process may be used to help facilitate the group context resumption service. In an analogous example, if a phone is purchased or leased from a given wireless service provider, then the phone must be registered with the wireless service provider so it knows who the subscriber is for billing purposes and so it can capture the subscriber's preferences for such things as long distance service provider and the type of rate schedule which should be applied to the subscriber. Similarly, each individual wishing to utilize the group context resumption service may be required to register each of the individual's respective electronic devices (e.g., smart phone, laptop, tablet, etc.), including a device identifier, phone number, login identifier, fingerprint login, and/or other information which can be used to associate a particular individual with each of any number of electronic devices in order to help facilitate the group context resumption service when the individual switches among different electronic devices between group collaboration sessions.

Figure 3:
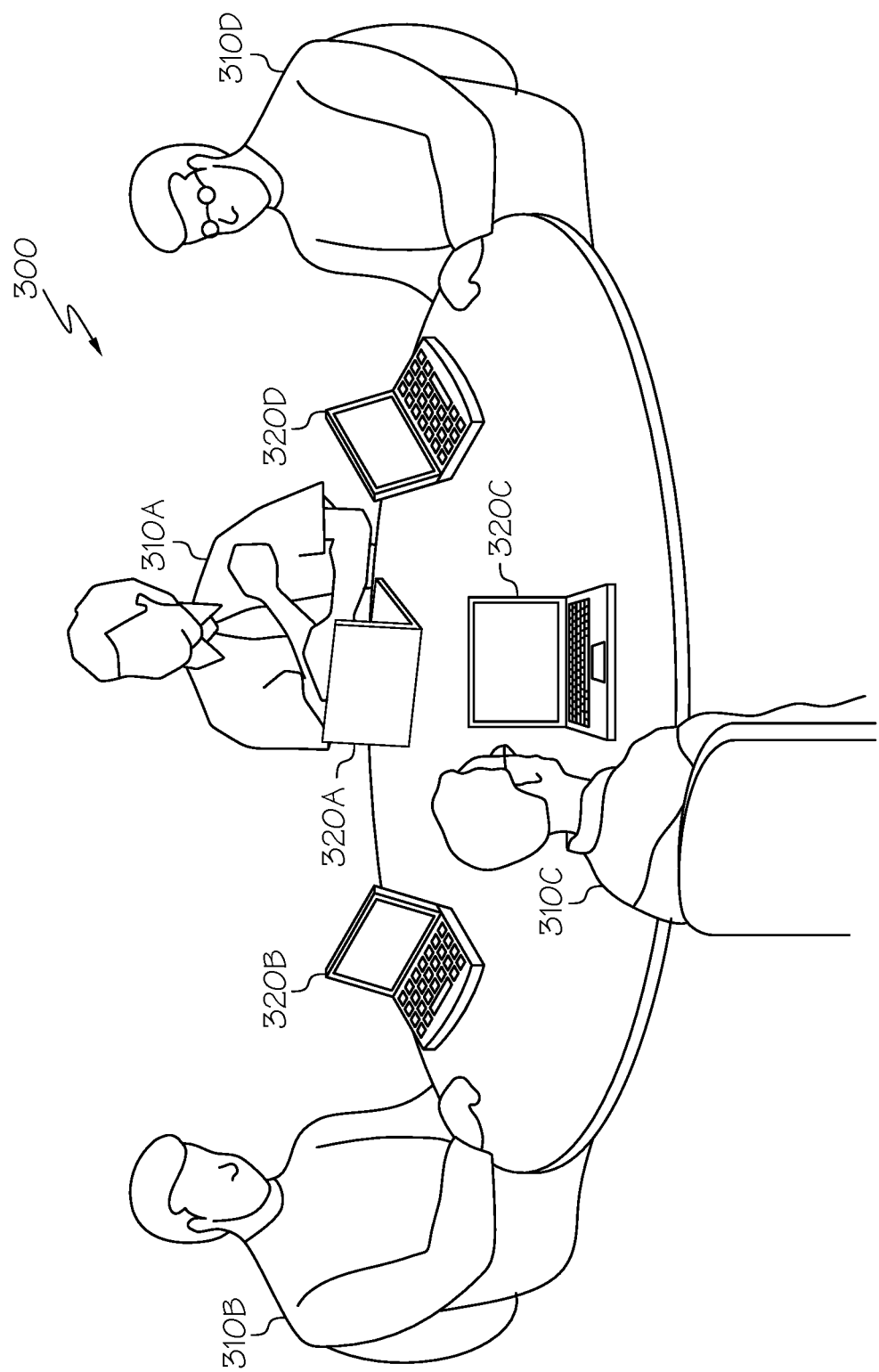
FIG. 3 shows a first collaboration session 300 among group members according to illustrative embodiments.

FIG. 3 shows a first collaboration session between group members. The functions/acts of each component of FIG. 2 will be described in detail below with reference to FIG. 3. As shown in FIG. 3, Abe 310A using laptop 320A leads a meeting with three co-workers: Betty 310B using laptop 320B, Chris 310C using laptop 320C, and Doug 310D using laptop 320D. Abe 310A is keeping meeting minutes using a word processing application, while Beth 310B and Chris 310C are each taking meeting notes using the same word processing application. Doug 310D is updating an issue log using a spreadsheet application.

Context collection component 220 of system 50, as executed by computer system/server 12, is configured to collect a current context related to applications executing on a user electronic device of a user (e.g., group leader, meeting facilitator, etc.) and device information related to the user electronic device. As used herein, the term "context" may include any application and state information necessary to restore an application (or multiple applications) a user has active to a previous state, such as the state when the user using the application ends a collaboration session (e.g., a meeting, event, etc.) with others. Application information for a particular application may include, but is not limited to, any windows, panels, and/or panes of the application, a position of a toolbar of the application, any data related to the application such as a data file (e.g., data file path or URL, particular section or tab of the data file, etc.) or communication with which the user is working, application history (e.g., chat history for an instant messaging application), configuration information of the application, or the like. Context collection component 220 may further be configured to collect device-specific information for the user electronic device such as device model, operating system, device identifier, phone number, login identifier, fingerprint login, and the like.

Referring back to FIG. 3, a current context is collected for user electronic device (laptop) 320A. To that end, application data related to the word processing application in which Abe 310A is taking meeting minutes is collected so that Abe 310A will be able to resume his current context at the beginning of the next collaboration session. The application data may include the file name and file path related to that meeting minutes document that Abe 310A is actively updating. Application data related to any additional applications that Abe 310A has open at the end of the collaboration session will also be collected to complete the current context of user electronic device 320A. Device-specific information related to user electronic device 320A may also be collected. The current context and any device-specific information are stored in context database 270.

Group determination component 210 of system 50, as executed by computer system/server 12, is configured to associate one or more participant electronic devices with a user electronic device. To that end, group determination component 210 discovers one or more participant electronic devices of individuals who are collaborating (e.g., during a meeting) with a user having a user electronic device. The user electronic device may be associated with a participant electronic device based on a connection option, such as the two devices are in the same location or are virtually connected. In an embodiment, group determination component 210 may automatically detect surrounding participant electronic devices in a same location using a short-range communication scheme such as Wi-Fi, Bluetooth, Near Field Communication (NFC), or the like. In another embodiment, if people are virtually connected, it can be detected either by reviewing a calendar entry and a conference phone number to determine which participant electronic devices are engaged in the collaboration session.

In an embodiment, a user may confirm the participant electronic devices that are participating in a collaboration session. For example, group determination component 210 may be configured to provide a user interface on a display (e.g., monitor, screen, etc.) of the user's electronic device which permits the user to select the other members of a group based on a listing of detected participant electronic devices. Participant electronic devices may be selected from the provided listing in the user interface via a user input device (e.g., a mouse, keyboard, touch pad, touch screen, remote control, voice controller, etc.). Referring back to FIG. 3, group determination component 210 identifies nearby laptops 320B, 320C, and 320D (i.e., participant electronic devices) of the other members in the meeting using a short-range communication scheme.

Context collection component 220 of system 50, as executed by computer system/server 12, is further configured to collect context and device information (as described above) from each of the identified participant electronic devices associated with the user's electronic device. Context and device information for each participant electronic device is collected and recorded so that the individuals may easily and quickly resume execution from the context should the group members meet together at a later time. In an embodiment, each participant electronic device may allow context collection component 220 (e.g., grant permission) to pull context and device information directly from each respective participant electronic device. In another embodiment, each participant electronic device may push (e.g., via a previously installed software agent program installed or accessible by the device), at the request of context collection component 220, its respective context and device information to context collection component 220.

In an embodiment, context collection component 220 may collect context and device information based on one or more predefined "triggers". For example, the context and device information may automatically be collected and recorded when a user performs a function which will power off the user's electronic device or put the electronic device in "sleep" mode. In this case, it can be assumed the group collaboration session is concluding and the context and device information for the user electronic device and participant electronic devices can be collected and recorded so the context may be resumed at a later time. Alternatively or in addition, the automatic collection and recordation may be performed based on an existing calendar entry. For example, an entry in a user's calendar may show a business meeting from 9 a.m. until 10 a.m. At 10 a.m., the context and device information may be automatically collected and recorded because it can be assumed the business meeting is concluding. In another embodiment, a user may perform a manual function on the electronic user device (e.g., selecting an option in a previously installed application) to trigger the collection and recording of all context and device information.

Referring back to FIG. 3, context collection component 220 further collects a current context for each of laptops 320B, 320C, and 320D as the meeting between Abe 310A, Betty 310B, Chris 310C, and Doug 310D ends. Application data (e.g., file name, file path, etc.) related to the word processing application in which Beth 310B is taking meeting notes is collected. The same is true for Chris 310C who is also taking meeting notes using the word processing application. Application data related to the spreadsheet application used by Doug 310D to update an issue log is also collected. Application data such as a file name, file path, an active sheet tab, and the like, may be collected so that Doug 310D may resume the application at the same point where he left off at a later collaboration session. Application data related to any additional applications open on laptops 320B, 320C, and 320D at the end of the collaboration session will also be collected to complete the current context for each of the respective devices. Device-specific information related to laptops 320B, 320C, and 320D may also be collected.

Context recordation component 230 of system 50, as executed by computer system/server 12, is configured to record the collected context and device information related to the user electronic device and associated participant electronic devices based on a trigger (i.e., either automatically or manually) as described above. In an embodiment, context recordation component 230 may transmit context and device information to context server 260 to be stored in context database 270. Context database 270 may include a relational database, which can be implemented in a combination of hardware (i.e., physical data storage hardware) and software (i.e., relational database software). Although context database 270 is shown as separate from context server 260, context database 270 may be integral to or separate from context server 260.

In an embodiment, context recordation component 230 is configured to transmit a context as metadata, along with device information, for a user's electronic device to context server 260 to be stored in context database 270. For example, a user may be in the middle of replying to a manager's last message using a messaging application (e.g., ACME Messenger) when the user is interrupted. Metadata is data about data. In the case of a messaging application, metadata may include, but is not limited to, application name, recipient, message, time stamp, and message type, as shown below.

<application>ACME Messenger</application><to>Joe Boss</to><message>Hello Mr. Boss, thank you for your note. I will be following up with</message><timestamp>11:45 am</timestamp><action>Reply</action>

Referring again to FIG. 3, the current context and any device-specific information for each of laptops 320B, 320C, and 320D are stored as metadata in context database 270. The stored metadata may be retrieved at the beginning of a later collaboration session to facilitate resuming a respective context on a device related to each participant in the collaboration group.

Context recordation component 230 may further be configured to transmit the context and device information for each associated participant electronic device collaborating with the user electronic device to context server 260 to be stored in context database 270. In an embodiment, the transmission may occur following the collection of the context and device information, as described above (e.g., at the end of a meeting, etc.). Storage of the context and device information for all collaborating participant electronic devices allows the participants to easily and quickly resume their interactions at a later time. Referring back to FIG. 3, context recordation component 230 transmits context and device information as metadata for each of the laptops 320B, 320C, and 320D to be stored in context database 270.

In an embodiment, agreement among all participants may be required prior to storing the metadata in context database 270. To that end, context recordation component 230 may be configured to receive an affirmation from each participant electronic device. For example, each participant in the group may be required to affirm agreement by selecting (e.g., clicking, touching, etc.) an "OK to save" option on a pop-up box displayed on the respective device. In another embodiment, another means for affirming agreement may be used. If each participant agrees, context recordation component 230 saves the metadata in context database 270.

Context resumption component 240 of system 50, as executed by computer system/server 12, is configured to resume a context on one or more participant electronic devices of individuals collaborating (e.g., during a meeting) with a user electronic device when beginning a second collaboration session. For example, context resumption component 240 may determine whether there is any context to be resumed when a user electronic device is resumed such as when a user powers on the user electronic device, brings the user electronic device out of a "sleep" mode, or the like. At that time, group determination component 210 determines any current surrounding users using any of the methods described above (e.g., Wi-Fi, Bluetooth, etc.). Electronic devices for the user and surrounding individuals (i.e., current interacting group) are compared against each context stored in context database 270 to determine if a prior context has been stored for this assemblage of individuals. If a prior context is found, the context on the user electronic device and associated participant electronic devices may be resumed.

In an embodiment, group determination component 210 may be configured to determine whether a group member is using a different electronic device than the device used when the context was originally stored. For example, Betty 310B used laptop 320B when the group originally met. At a second meeting, Betty 310B member has brought along a tablet rather than her laptop 320B. In an embodiment, group determination component 210 may determine that Betty 310B is also at the second meeting and has just switched devices because Betty 310B previously registered both devices under her name. In another embodiment, a different technique may be used to determine a group member has only switched devices. For example, a login identifier of the second device may be compared against a login identifier of the first device to determine the devices are associated with a single user. In yet another example, a fingerprint or voice sample associated with the first device may be compared against the same for the second device to determine a single user is associated with each device. If it is determined that the collaboration session includes different individuals from any stored context, a new context may be created.

Context resumption component 240 may is configured to retrieve the metadata from context database 270 in order to facilitate the resumption of context on the group's devices. For example, context resumption component 240 retrieves application data, stored as metadata, related to laptop 320A used by Abe 310A who was keeping meeting minutes using a word processing application during the previous session. The application data may include, among other things, the file name, file path, and the Abe's last location being viewed within the file. Using this data, the meeting minutes file is opened in the word processing application at the point where Abe 310A left off. Assume that the only other application that Abe 310A had open was a web browser. The uniform resource locator (URL) of the website that Abe 310A had navigated to is also saved in the context. When Abe 310A begins the later meeting with the same group, this application is also opened using the same web address. In an embodiment, any other applications not open during the prior collaboration session are closed. In this way, the context for Abe 310A is exactly as it was at the end of the prior session.

Context resumption component 240 may further be configured to compare a context of a previous device with the available features of the current device if a group member switches devices between collaboration sessions. If an equivalent application can be found, context resumption component 240 may be configured to determine a proper view or configuration using application metadata stored in context database 270 to load in the second device. Context resumption component 240 allows application contexts to migrate from device to device, thus providing a smooth context migration without execution interruption. The group member will be able to quickly resume execution from the context on the second device at the exact same state where he/she left off on the first device. In this manner, the group member does not lose session continuity when moving between devices. For example, Betty 310B was using a word processing application to take meeting notes in the previous session. Context resumption component 240 determines that a word processing application is installed on Betty's tablet. Therefore, context resumption component 240 is able to, after retrieving the file name and file path stored as metadata, launch the word processing application and open the meeting notes file on the tablet for further viewing/editing.

In an embodiment, context resumption component 240 may further be configured to prompt a user prior to resuming a context. The user may choose to resume the context, not resume the context but allow the context to remain stored in context database 270, or request to reset the context information (i.e., remove the stored context from context database 270) associated with a given device or all devices. In another embodiment, a context may be automatically reset after a predefined number of days or after if a user chooses to not resume a context a predefined number of times when meeting with the same persons. For example, if Abe 310A declines to resume a context three times when meeting with Betty 310B, Chris 310C, and Doug 310D on three later occasions, it can may be assumed the context is no longer relevant and may be removed from context database 270.

Figure 4:
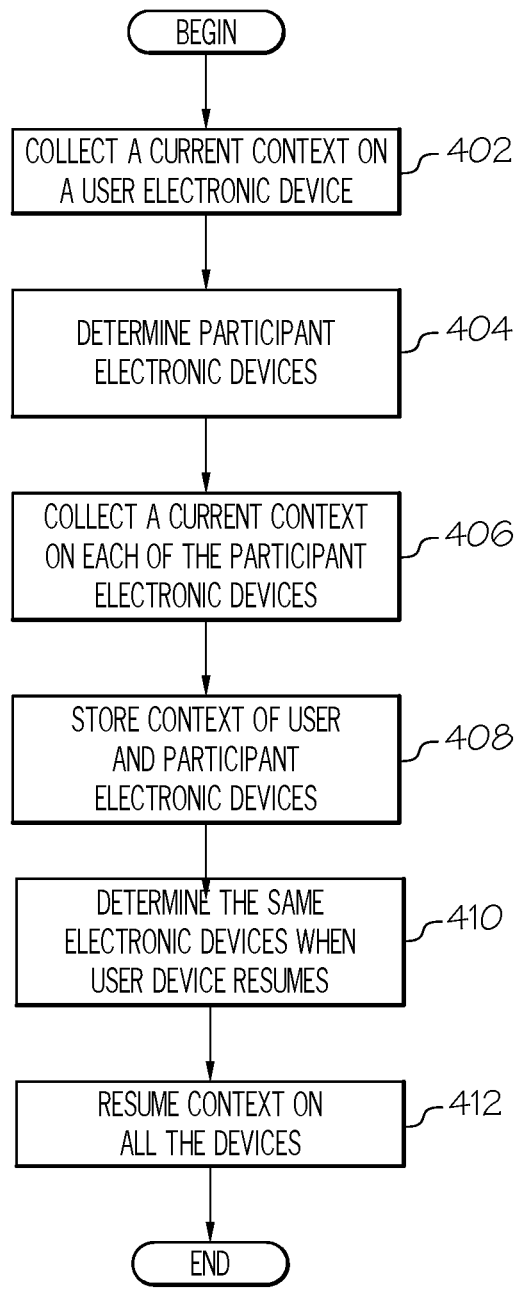
FIG. 4 shows a process flowchart for resuming a context for a group of electronic devices based on a prior activity of the group members according to illustrative embodiments.

Referring now to FIG. 4, in conjunction with FIG. 2, an implementation of a process flowchart for resuming a context for a group of electronic devices based on a prior activity of the group members is shown. At step 402, context collection component 220 collects, at a conclusion of a first collaboration session, a current context of a user electronic device. At step 404, group determination component 210 may determine one or more participant electronic devices are associated with the user electronic device, either by being in a same location or virtually connected (e.g., Skype™, etc.). At step 406, context collection component 220 collects a current context of each of the one or more participant electronic devices. At step 408, context recordation component 230 stores the context of the user electronic device and each of the participant electronic devices in context database 270. At step 410, context resumption component 240 determines, at a beginning of a second collaboration session, the one or more participant electronic devices when the user electronic device is resumed (e.g., a user electronic device is powered on or brought out of "sleep" mode). At step 412, context resumption component 240 resumes the current context on each of the user electronic device and the one or more participant electronic devices. Any applications on the different devices not included in the respective context may be closed.

Process flowchart of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for resuming a context for a group of electronic devices based on a prior activity of the group members. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for resuming a context for a group of electronic devices based on a prior activity of the group members. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for resuming a context for a group of electronic devices based on a prior activity of the group members. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer program product for resuming a group context, and program instructions stored on the computer readable storage device, to:
   collect, at a conclusion of a first collaboration session, a current context of a user electronic device;
   identify a participant electronic device that is associated with the user electronic device;
   collect a current context of the participant electronic device;
   store, as metadata, the current context of the user electronic device and the participant electronic device;
   identify, at a beginning of a second collaboration session, the participant electronic device when the user electronic device is resumed; and resume, based on the metadata, the current context of the user electronic device and the participant electronic device, wherein the step to resume includes closing any applications on the user electronic device that are not associated with the current context of the user electronic device and closing any applications on the participant electronic device that are not associated with the current context of the participant electronic device.

2. The computer program product of claim 1, wherein the participant electronic device is associated with the user electronic device based on a connection option, wherein the connection option is selected from the group consisting of the user electronic device and the participant electronic device are in a same location or the user electronic device and the participant electronic device are virtually connected.

3. The computer program product of claim 1, further comprising program instructions to store the metadata in a context database.

4. The computer program product of claim 2, further comprising program instructions to determine the user electronic device and the participant electronic device are in the same location using a short-range communication scheme when the connection option is the user electronic device and the participant electronic device are in the same location.

5. The computer program product of claim 2, further comprising program instructions to determine the user electronic device and the participant electronic device are virtually connected based on a calendar entry and a conference phone number when the connection option is the user electronic device and the participant electronic device are virtually connected.

6. The computer program product of claim 1, wherein a context includes application information needed to restore one or more active applications to a previous state.

7. The computer program product of claim 1, wherein a user electronic device is resumed when the user electronic device is at least one of powered on or brought out of a sleep mode.

8. A computer system for resuming a group context, the computer system comprising:
 a memory medium comprising program instructions;
 a bus coupled to the memory medium; and
 a processor for executing the program instructions, the instructions causing the system to:
  collect, at a conclusion of a first collaboration session, a current context of a user electronic device;
  identify a participant electronic device that is associated with the user electronic device;
  collect a current context of the participant electronic device;
  store, as metadata, the current context of the user electronic device and the participant electronic device;
  identify, at a beginning of a second collaboration session, the participant electronic device when the user electronic device is resumed; and
  resume, based on the metadata, the current context of the user electronic device and the participant electronic device, wherein the step to resume includes closing any applications on the user electronic device that are not associated with the current context of the user electronic device and closing any applications on the participant electronic device that are not associated with the current context of the participant electronic device.

9. The computer system of claim 8, wherein the participant electronic device is associated with the user electronic device based on a connection option, wherein the connection option is selected from the group consisting of the user electronic device and the participant electronic device are in a same location or the user electronic device and the participant electronic device are virtually connected.

10. The computer system of claim 8, further comprising program instructions to store the metadata in a context database.

11. The computer system of claim 9, further comprising program instructions to determine the user electronic device and the participant electronic device are in the same location using a short-range communication scheme when the connection option is the user electronic device and the participant electronic device are in the same location.

12. The computer system of claim 9, further comprising program instructions to determine the user electronic device and the participant electronic device are virtually connected based on a calendar entry and a conference phone number when the connection option is the user electronic device and the participant electronic device are virtually connected.

13. The computer system of claim 8, wherein a context includes application information needed to restore one or more active applications to a previous state.

14. The computer program product of claim 8, wherein a user electronic device is resumed when the user electronic device is at least one of powered on or brought out of a sleep mode.

* * * * *